(12) United States Patent
Zaman et al.

(10) Patent No.: US 12,003,506 B2
(45) Date of Patent: Jun. 4, 2024

(54) BIOMETRICS BASED ACCESS CONTROLS FOR NETWORK FEATURES

(71) Applicant: ARRIS Enterprises LLC, Suwanee, GA (US)

(72) Inventors: Akhtar Ghaus Zaman, Karnataka (IN); Muralidharan Narayanan, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 17 days.

(21) Appl. No.: 17/407,666

(22) Filed: Aug. 20, 2021

(65) Prior Publication Data

US 2022/0109671 A1 Apr. 7, 2022

Related U.S. Application Data

(60) Provisional application No. 63/088,566, filed on Oct. 7, 2020.

(51) Int. Cl.
| | |
|---|---|
| *H04L 9/40* | (2022.01) |
| *G06V 40/70* | (2022.01) |
| *H04L 67/306* | (2022.01) |
| *H04L 67/52* | (2022.01) |

(52) U.S. Cl.
CPC ......... *H04L 63/0861* (2013.01); *G06V 40/70* (2022.01); *H04L 67/306* (2013.01); *H04L 67/52* (2022.05)

(58) Field of Classification Search
CPC ... H04L 63/0861; H04L 67/52; H04L 67/306; G06V 40/70

USPC .......................................................... 726/7
See application file for complete search history.

(56) References Cited

U.S. PATENT DOCUMENTS

| | | | |
|---|---|---|---|
| 6,256,737 B1* | 7/2001 | Bianco | G07C 9/37 713/186 |
| 10,911,425 B1* | 2/2021 | Hitchcock | G06F 21/34 |
| 11,303,631 B1* | 4/2022 | Alexanian | G06F 21/32 |
| 2008/0313718 A1* | 12/2008 | Milgramm | H04N 5/772 726/5 |
| 2011/0035788 A1* | 2/2011 | White | H04L 9/3231 726/4 |

(Continued)

*Primary Examiner* — Alan S Chou
(74) *Attorney, Agent, or Firm* — Wenderoth, Lind & Ponack, L.L.P.

(57) ABSTRACT

To prevent unauthorized access to a network feature, multiple levels of authentication are required by utilizing a biometric authentication application that can verify access based on an authentication configuration that, for example, includes biometric data associated with a user. Requiring additional authentication to one or more network features or settings while allowing one or more other network features or settings to have less authentication provides a quality of experience for every user with access to the application while maintaining enhanced security to those network features that may be key/sensitive or require additional security. Additionally, using biometric data to perform the additional level of authentication ensures that a particular user seeking access to key or sensitive network features or settings of a network is the authorized user and not another user that has gained access to a network device associated with the authorized user.

20 Claims, 7 Drawing Sheets

(56) References Cited

U.S. PATENT DOCUMENTS

| | | | |
|---|---|---|---|
| 2013/0227666 A1* | 8/2013 | White | G06F 21/32 |
| | | | 726/7 |
| 2016/0087952 A1* | 3/2016 | Tartz | H04W 12/06 |
| | | | 455/411 |
| 2016/0087957 A1* | 3/2016 | Shah | H04L 63/205 |
| | | | 726/1 |

* cited by examiner

| Authentication Level | Iris Recognition | Facial Recognition | Fingerprint | OTP | Voice |
|---|---|---|---|---|---|
| 1 | Yes | Yes | Yes | Yes | Yes |
| 2 | Yes | Yes | No | Yes | Yes |
| 3 | Yes | No | No | Yes | Yes |
| 4 | No | Yes | Yes | Yes | No |
| 5 | No | No | Yes | Yes | No |
| 6 | No | No | No | Yes | No |
| 7 | No | No | Yes | No | No |
| 8 | No | No | No | Yes | No |

FIG. 4A

| Feature | Authentication Level |
|---|---|
| Subnet Change | 1 |
| Network Transaction | 2 |
| Parental Control | 4 |
| Primary Network Password | 4 |
| Guest Network Password | 5 |
| QoS | 5 |
| Time Zone | 7 |
| Default Device Information | 8 |

FIG. 4B

| Feature | Previously Stored Biometric Data |
|---|---|
| Subnet Change | <User 502 data> |
| Network Transaction | <User 502 data> |
| Parental Control | <User 502 data> |
| Primary Network Password | <User 502 data> |
| Guest Network Password | <User 502 data>; <User 503 data> |
| QoS | <User 502 data>; <User 503 data> |
| TimeZone | <User 502 data>; <User 503 data> |
| Default Device Information | <User 502 data>; <User 503 data> |

FIG. 4C

BIOMETRICS BASED ACCESS CONTROLS FOR NETWORK FEATURES

BACKGROUND

Companies are increasingly providing Multiple Access Point (MAP) architecture or Home Network Controller (HNC) type of home Wi-Fi management, with multiple access point devices and/or extender access point devices within the home to improve Quality of Experience (QoE) of the user for various client devices by offering extended coverage with seamless roaming in a network environment. Access point devices and extender access point devices communicate with client devices using one or more RF channels. Whether configured by a system administrator or a user, authentication and security controls for sensitive or key configuration features of a network device in the network environment are becoming more essential.

In a network environment, multiple users may have access to the network using a variety of network devices. To provide seamless access to the network under such circumstances, a network environment can be configured to control access to certain sensitive or key network features or settings, for example, network features or settings associated with an access point device. Many access point devices either have no user interface or a limited user interface for configuration of the access point device and thus must be configured or on-boarded via an application, for example, a control application running on a paired or communicatively coupled network device. Generally, only log-in authentication is required to access any of the network features or settings, for example, a username and password set up during the on-boarding process of the access point device. Any user who has log-in credentials or who is authenticated at log-in can access any feature of the control application including features that allow for the configuration of one or more network devices and/or a network transaction.

Thus, there is a need to provide multiple levels of authentication for access and alteration of sensitive/key settings or transactions of a network device accessible via a control application.

SUMMARY

According to aspects of the present disclosure there are provided novel solutions for enhancing security for certain key or sensitive features or settings of a network device accessible via a control application. Generally, a network environment includes multiple users accessing a variety of network devices. Any one or more of the users can have access to a control application that interfaces with one or more network features or settings. The control application, for example, can allow the user to access, update and/or alter any one or more settings for a network including key or sensitive settings. Such access can include, but is not limited to, the ability of the user to perform one or more operations, such as any of set, alter, change, view, any other type of access, or any combination thereof. Such access can impact the security of one or more network devices connected to the network. For example, a parent can set parental controls using the control application but a child or guest who has access to the control application could alter those parental controls without permission from or knowledge of the parent if no extra level of security or authentication is required.

Even when users are required to have a one-time password (OTP) to access the control application, all users of the control application are generally given the same level of access. Additionally, an OTP can be thwarted by mischievous users or other bad actors. Thus, there is a need to provide multiple levels of authentication for a one or more network features or settings accessible via a control application, for example, associated with an access point device. Once the access point device is onboarded, a user can enable/control access to various sensitive or key features or settings associated with the network provided by the access point device by utilizing a biometric authentication application that can verify access based on an authentication configuration that, for example, includes biometric data associated with a user. Using biometrics to authenticate the access level of a user ensures the security of one or more network features or settings. Requiring additional authentication to one or more network features or settings while allowing one or more other network features or settings to have less authentication provides a quality of experience (QoE) for every user with access to the application while maintaining enhanced security to those one or more network features that may be key/sensitive or require additional security. Additionally, using biometrics to perform the additional level of authentication ensures that a particular user seeking access to key or sensitive network features or settings of a network is an authorized user.

An aspect of the present disclosure provides a method for utilizing a biometric authentication application to control access to one or more features of the network. The method comprises receiving a request from a user of a client device to access a network feature, receiving a biometric data associated with the user of the client device, determining an authentication level associated with the network feature, verifying access to the network feature, wherein the verifying the access comprises, comparing the biometric data to previously stored biometric data associated with the user based, at least in part, on the authentication level, and controlling access to the network feature by the user based, at least in part, on the comparison.

In an aspect of the present disclosure, the method further comprises controlling access to the network feature by the user based, at least in part, on the comparison.

In an aspect of the present disclosure, the method further comprises that the authentication level is associated with a plurality of biometric types.

In an aspect of the present disclosure, the method further comprises that the plurality of biometric types comprises any of a voice scan, a fingerprint, a retinal scan, a one-time password (OTP), a facial recognition, or a combination thereof.

In an aspect of the present disclosure, the method further comprises determining a location of the client device and wherein the determining the authentication level is based, at least in part, on the location of the client device.

In an aspect of the present disclosure, the method further comprises determining a user profile associated with the user and wherein the determining the authentication level is based, at least in part, on the user profile associated with the user.

In an aspect of the present disclosure, the method comprises that the request is for creating an authentication configuration.

An aspect of the present disclosure provides a biometric repository coupled to a network for providing authentication for access to network feature by a user of a client device. The biometric repository comprises a memory storing one or more computer-readable instructions and a processor configured to execute the one or more computer-readable instructions to receive a request from a client device, wherein the request is associated with access to a network feature, receive a biometric data associated with the user of the client device, determine an authentication level associated with the network feature, verifying access to the network feature, wherein the verifying the access comprises comparing the biometric data to previously stored biometric data associated with the user based, at least in part, on the authentication level, and control access to the network feature by the user based, at least in part, on the comparison.

In an aspect of the present disclosure, the processor is further configured to execute the one or more computer-readable instructions to create an authentication configuration, wherein creating the authentication configuration comprises receiving one or more initial biometric data associated with the user, storing the one or more initial biometric data as the previously stored biometric data, associating the biometric data with one or more features, wherein the one or more features comprise the network feature, associating the one or more features with one or more authentication levels, wherein the one or more authentication levels comprise the authentication level, and associating the one or more authentication levels with one or more biometric types, wherein the initial biometric data is associated with at least one of the one or more biometric types.

In an aspect of the present disclosure, the processor is further configured to execute the one or more computer-readable instructions to associate the user with a user profile, and wherein the verifying the access to the network feature is based, at least in part, on the user profile associated with the user.

In an aspect of the present disclosure, the authentication level is associated with a plurality of biometric types.

In an aspect of the present disclosure, the plurality of biometric types comprises any of a voice scan, a fingerprint, a retinal scan, a one-time password (OTP), a facial recognition, or a combination thereof.

In an aspect of the present disclosure, the processor is further configured to execute the one or more computer-readable instructions to determine a location of the client device and wherein the determining the authentication level is based, at least in part, on the location of the client device.

In an aspect of the present disclosure, the biometric repository is remote from the client device.

An aspect of the present disclosure provides a non-transitory computer-readable medium of, for example, a network device, for storing one or more computer executable instructions for authenticating access to a network feature. The one or more computer executable instructions when executed by a processor of the network device, cause the network device to perform one or more operations including the steps of the methods described above.

Thus, according to various aspects of the present disclosure described herein, it is possible to provide a biometric authentication application that uses biometric data associated with a user or user profile so as to provide an additional level of authentication, for example, in addition to a single sign-on (SSO), such as a user name and/or password.

BRIEF DESCRIPTION OF DRAWINGS

In the drawings, like reference numbers generally indicate identical, functionally similar, and/or structurally similar elements.

FIGS. 4A, 4B, and 4C illustrate an exemplary authentication configuration, according to one or more aspects of the present disclosure;

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
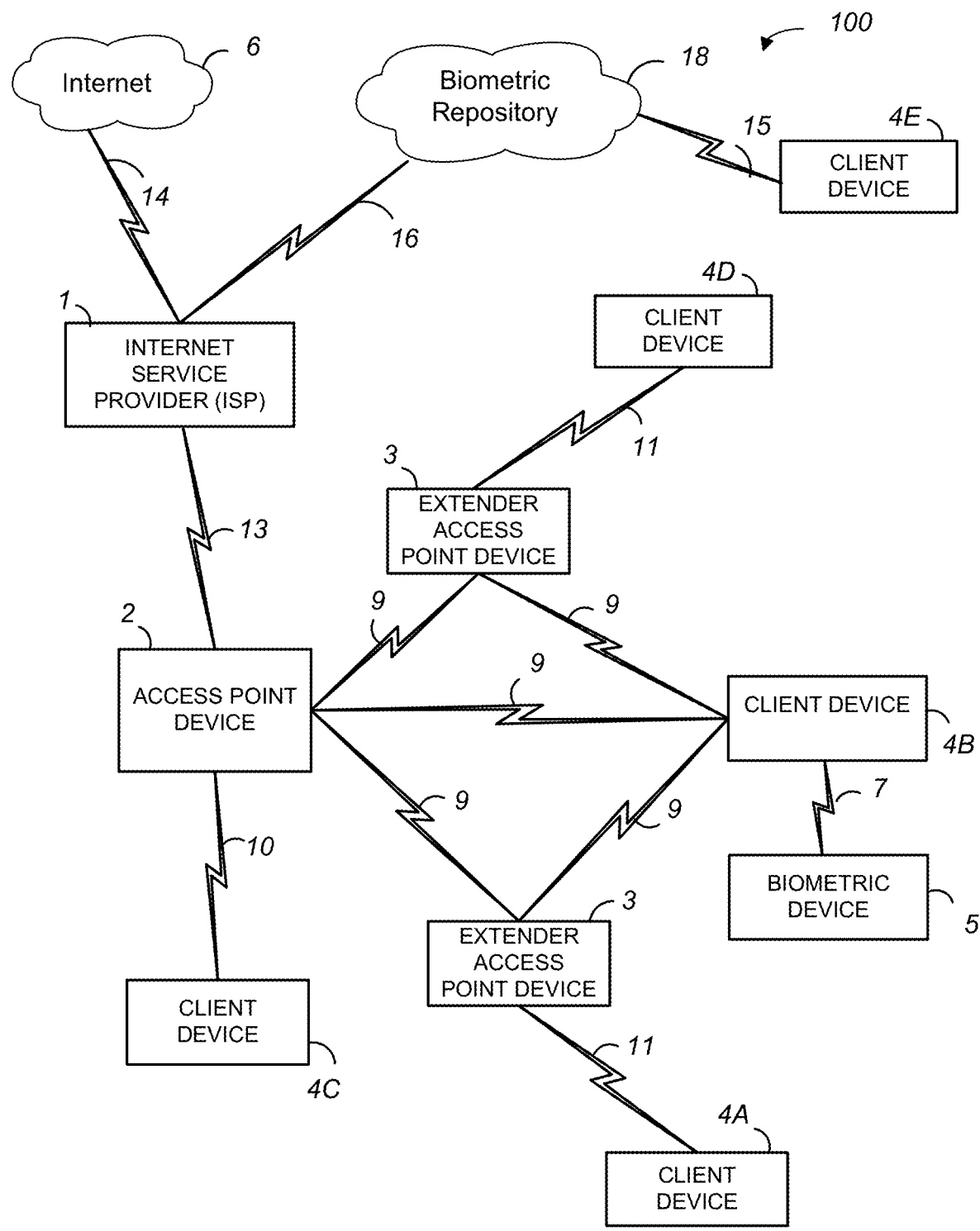
FIG. 1 is a schematic diagram of a network environment, according to one or more aspects of the present disclosure.

FIG. 1 is a schematic diagram of a network environment 100, according to one or more aspects of the present disclosure.

It should be appreciated that various example embodiments of inventive concepts disclosed herein are not limited to specific numbers or combinations of devices, and there may be one or more multiple of some of the aforementioned network devices in the system, which may itself consist of multiple communication networks and various known or future developed wireless connectivity technologies, protocols, devices, and the like.

As shown in FIG. 1, the main elements of the network environment 100 include an access point device 2 connected to the Internet 6 via an Internet Service Provider (ISP) 1, a biometric repository 18 and also connected to different wired and/or wireless network devices such as one or more extender access point devices 3 and one or more client devices 4A, 4B, 4C, 4D and/or 4E (collectively referred to as client device(s) 4). The network environment 100 shown in FIG. 1 includes wireless network devices (e.g., extender access point devices 3 and client devices 4 (such as client devices 4A-4E) that may be connected in one or more wireless networks (e.g., private, guest, iControl, backhaul network, or Internet of things (IoT) network) within the network environment 100. Additionally, there could be some overlap between wireless network devices (e.g., extender access point devices 3 and client devices 4) in the different networks. That is, one or more network or wireless devices could be located in more than one network. For example, the extender access point devices 3 could be located both in a private network for providing content and information to any of client devices 4 and also included in a backhaul network or an iControl network. In one or more embodiments, any one or more network devices can be wired network devices.

A biometric authentication application can support control and management of access and authentication of one or more features or settings of a network device, for example, an access point device 2, an extender access point device 3, a client device 4, any other device connected to the network, or a combination thereof. The biometric authentication application can be installed and ran on any network device, for example, a user device such as any client device 4. While typical biometric authentication applications only require a password, such as an OTP, additional authentication or security measures can be advantageous to maintain and enhance one or more configuration settings and/or network transactions associated with any network device. Such additional authentication can include biometric data that is stored in a repository local to or remote from a network, such as biometric repository 18, as discussed herein. One or more network devices as discussed herein can be utilized to perform this additional biometric authentication.

Starting from the top of FIG. 1, the ISP 1 can be, for example, a content provider or any computer for connecting the access point device 2 to the Internet 6, the biometric repository 18, or both for access to an asset, such as data, information, a network transaction, etc. The Internet 6 can send or transmit one or more requested assets to the ISP 1, for example, one or more assets associated with biometric data stored in biometric repository 18. The biometric repository 18 can include any of a server, a software and/or application, a uniform resource locator (URL), an application program interface (API), a database, any other type of repository and/or storage medium, a client device 4, an access point device 2, or a combination thereof. An asset can include, but is not limited to, biometric data associated with a user, any other information received at/from ISP 1, or a combination thereof. The connection 14 between the Internet 6 and the ISP 1, the connection 16 between the ISP 1 and the biometric repository 18, and the connection 13 between the ISP 1 and the access point device 2 can be implemented using a wide area network (WAN), a virtual private network (VPN), a metropolitan area networks (MAN), a system area networks (SAN), a data over cable service interface specification (DOCSIS) network, a fiber optics network (e.g., FTTH (fiber to the home) or FTTX (fiber to the x), or a hybrid fiber-coaxial (HFC)), a digital subscriber line (DSL), a public switched data network (PSDN), a global Telex network, or a 2G, 3G, 4G, 5G, or 6G network, for example. In one or more embodiments, the biometric repository 18 can be located within any of one or more network devices coupled to the network, be accessed via Internet 6, any other location, or a combination thereof.

Any of the connections 13, 14, 15, 16, or any combination thereof (collectively referred to as network connections) can further include as some portion thereof a broadband mobile phone network connection, an optical network connection, or other similar connections. For example, any of the network connection can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that any of the network connections are capable of providing connections between a network device and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway, such as a residential gateway, that combines the functions of a modem, an access point (AP), and/or a router for providing content received from the ISP 1 to one or more network devices (e.g., wireless extender access point devices 3 and client devices 4) in the network environment 100. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP). Further, an access point device 2 can be an electronic device that includes or interfaces with a control application or software for controlling or configuring one or more network settings or features.

The connection 9 between the access point device 2, the wireless extender access point devices 3, and client devices 4 can be implemented using a wireless connection in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information associated with an asset, for example, content received from and/or communicated to ISP 1. In one or more embodiments, client device 4B (also referred to as user device 4B) can be communicatively coupled to a biometric tracking service 18 via a connection 9 to access point device 2 and via connections 13 and 16 from access point device 2 to biometric repository 18.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, client devices 4, which may be out of range of the access point device 2. The extender access point devices 3 can also receive signals from the client devices 4 and rebroadcast the signals to the access point device 2, or other client devices 4. While FIG. 1 illustrates a direct connection between extender access point devices 3 and the access point device 2, the present disclosure contemplates an indirect connection as well, for example, via an additional extender access point device 3.

The connections 11 between the extender access point devices 3 and the client devices 4 are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz, or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The client devices 4 can be, for example, hand-held computing devices, personal computers including, but not limited to, any of a desktop computer or a laptop, an electronic tablet, a mobile phone, a smart phone, a smart speaker, an IoT device, an iControl device, a portable music player with smart capabilities capable of connecting to the Internet, a cellular network, and/or interconnecting with other devices via Wi-Fi and/or Bluetooth, other wireless hand-held consumer electronic devices, or any combination thereof. In one or more embodiments, client devices 4 can connect to any one or more other network devices. For example, client devices 4A and 4D can connect to an extender access point device 3, client device 4B can connect to a biometric device 5, client device 4C can connect directly to an access point device 2, client device 4E can connect directly to a biometric repository 18.

Client device 4B can be connected via connection 7 to a biometric scanning device 5 via Wi-Fi, Bluetooth, or any other type of connection. In one or more embodiments, a biometric scanning device 5 is internal to client device 4B. Connection 7 can utilize any one or more protocols discussed above with respect to connection 9. Biometric scanning device 5 can be a device to sense or detect one or more biometric parameters associated with a user. For example, biometric scanning device 5 can be any device that provides scans or data associated with any one or more biometrics including, but not limited to, devices or applications that provide information or data associated with any of a voice scan, a facial pattern scan, a retinal scan, an iris scan, a thumbprint scan, any other biometric scan, or a combination thereof. The biometric scanning device 5 can format the biometric scan of the user into a format for any of storing at a client device 4B, communicating or sending to a biometric repository 18, use by an application of a client device 4B, for example, a biometric authentication application 32 or 332 as discussed with reference to FIGS. 3A and 3B, respectively, or any combination thereof. While FIG. 1 illustrates only client device 4B as coupled to a biometric scanning device 5, the present disclosure contemplates that any one or more client devices 4 can be coupled to a biometric scanning device 5.

The connection 10 between the access point device 2 and the client device 4C can be implemented through a wireless connection that operates in accordance with, but is not limited to, any IEEE 802.11 protocols, for example, a connection that utilizes one or more channels. Additionally, the connection 10 between the access point device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example. The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. One or more of the connections 10 can also be a wired Ethernet connection.

Figure 2:
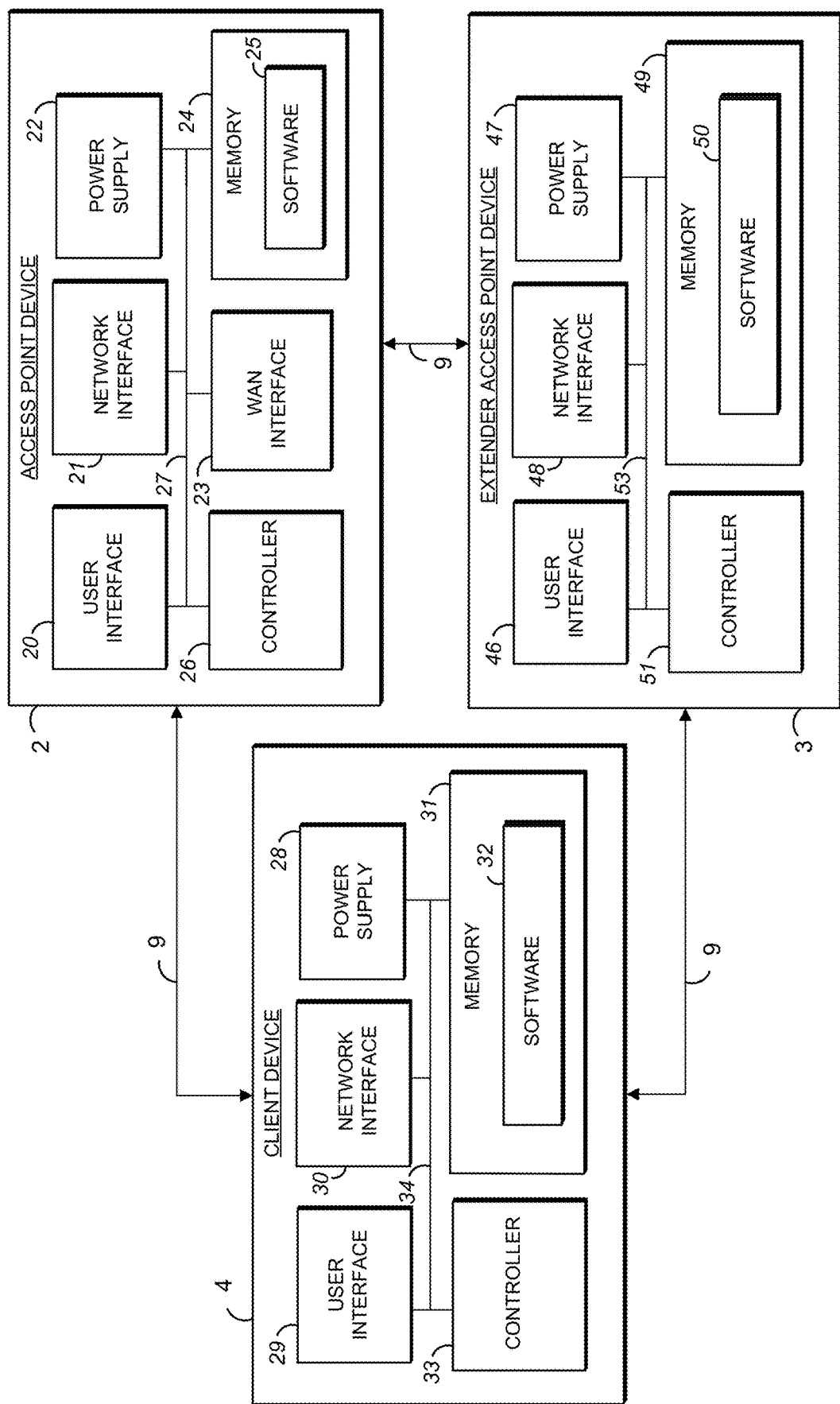
FIG. 2 is a more detailed block diagram illustrating various components of an exemplary access point device, client device, and extender access point device implemented in the network environment of FIG. 1, according to one or more aspects of the present disclosure.

A detailed description of the exemplary internal components of the access point device 2, the extender access point devices 3, and the client devices 4 shown in FIG. 1 will be provided in the discussion of FIG. 2. However, in general, it is contemplated by the present disclosure that the access point device 2, the extender access point devices 3, and the client devices 4 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing and/or network devices over the one or more network connections to local and wide area networks, wireless and wired networks, public and private networks, and any other communication network enabling communication in the network environment 100.

FIG. 2 is a more detailed block diagram illustrating various components of an exemplary access point device 2, client device 4, and wireless extender access point device 3 implemented in the system of FIG. 1, according to one or more embodiments.

Although FIG. 2 shows one extender access point device 3 and one client device 4, the extender access point device 3 and the client device 4 are meant to be representative of the other extender access point devices 3 and client devices 4 of a network system, for example, network environment 100 shown in FIG. 1. Similarly, the connections 9 between the access point device 2, the extender access point device 3, and the client device 4 shown in FIG. 2 are meant to be exemplary connections and are not meant to indicate all possible connections between the access point devices 2, extender access point devices 3, and client devices 4. Additionally, it is contemplated by the present disclosure that the number of access point devices 2, extender access point devices 3, and client devices 4 is not limited to the number of access point devices 2, extender access point devices 3, and client devices 4 shown in FIGS. 1-3 and 5.

Now referring to FIG. 2, the client device 4 can be, for example, any device as discussed with reference to FIG. 1, including, but not limited to, a computer, a portable device, an electronic tablet, an e-reader, a PDA, a mobile phone such as a smart phone, a smart speaker, an IoT device, an iControl device, a portable music player with smart capabilities capable of connecting to the Internet, cellular networks, and interconnecting with other devices via Wi-Fi and Bluetooth, or other wireless hand-held consumer electronic device capable of executing and displaying the content received through the access point device 2. For example, client device 4 can be coupled via a connection 7 to a biometric scanning device 5. Additionally, the client device 4 can include a biometric scanning device 5, such as any of a microphone, a camera, a fingerprint reader, a retinal scanner, an iris scanner, any other biometric scanner, or any combination thereof.

As shown in FIG. 2, the client device 4 includes a power supply 28, a user interface 29, a network interface 30, a memory 31, and a controller 33.

The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, any of one or more push buttons, a camera, a keyboard, a keypad, a liquid crystal display (LCD), a thin film transistor (TFT), a light-emitting diode (LED), a high definition (HD) or any other display device including a display device having touch screen capabilities so as to allow interaction between one or more users and the client device 4, or a combination thereof. User interface 29 can provide an interface for client device 4 to receive a biometric data associated with a user. For example, user interface 29 can provide an interface for any functionality associated with biometric scanning received from a biometric scanning device 5. For example, user interface 29 can be or be associated with one or more applications of client device 4 that allows a user to initiate a biometric scan to obtain biometric data associated with the user.

The network interface 30 can include, but is not limited to, various network cards, interfaces, and circuitry implemented in software and/or hardware to enable communications with the access point device 2 and the extender access point device 3 using the communication protocols in accordance with connection 9 (e.g., as described with reference to FIG. 1). For example, the network interface card 30 allows for communication between the client device 4 and the access point device 2 and/or a biometric tracking service 18 as discussed with reference to FIG. 1. As shown, network interface card 30 allows for direct communication with access point device 2 and indirect communication with access point device 2 via extender access point device 3. In one or more embodiments, network interface 30 allows the client device 4 to interface with a biometric scanning device 5, for example, over a Bluetooth or BLE connection. For example, the client device 4 can be paired with or otherwise connected to a biometric scanning device 5. In one or more embodiments, network interface 30 allows the client device 4 to send biometric data to, receive biometric data from, or both a biometric repository 18.

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32. In one or more embodiments, a client device 4 is an electronic or network device shared between multiple users, and software 32 includes a biometric authentication application comprising one or more computer readable instructions for interfacing with the access point device 2 and the extender access point device 3 so as to access a biometric repository 18 via ISP 1. In one or more embodiments, software 32 includes a biometric authentication application for configuring one or more network features or settings including features associated with access to the network by one or more network devices (such as a client device 4, an extender access point device 3, an access point device 2), a control application, one or more applications (such as one or more applications running one or more network devices), one or more users (such as a user associated with one or more user profiles), one or more transactions, any other network feature, or a combination thereof.

For example, software 32 can be a biometric authentication application that interfaces with a control application associated with or that interfaces with access point device 2, scans a user of the client device 4 for biometric data by interfacing with a biometric scanning device 5, creates, updates and/or accesses one or more authentication configurations, and/or performs access verification. In one or more embodiments, software 32 can be included within another application and/or accessed, controlled, executed, initiated, or queried by another application, such as a control application. Memory 31 can store any one or more authentication configurations. Memory 31 can comprise any of a Keychain storage, a database, a file system, any other storage medium, or any combination thereof for storing the one or more authentication configurations. For example, Keychain storage allows data to be shared strategically, for example, between applications from the same developer or that are otherwise linked.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure. Communication between the components (e.g., 28-31 and 33) of the client device 4 may be established using an internal bus 34.

The extender access point device 3 can be, for example, any wireless hardware electronic device used to extend a wireless network by receiving the signals transmitted by the access point device 2 and rebroadcasting the signals to one or more client devices 4, which may be out of range of the access point device 2 including, but not limited to, a wireless extender, a repeater, and/or an access point device. The extender access point device 3 can also receive signals from any one or more of the client devices 4 and rebroadcast the signals to the access point device 2, mobile device 5, or any other one or more client devices 4.

As shown in FIG. 2, the extender access point device 3 includes a user interface 46, a power supply 47, a network interface 48, a memory 49, and a controller 51. The user interface 46 can include, but is not limited to, push buttons, a keyboard, a keypad, an LCD, a TFT, an LED, an HD or other similar display device including a display device having touch screen capabilities so as to allow interaction between a user and the extender access point device 3. The power supply 47 supplies power to the internal components of the wireless extender access point device 3 through the internal bus 53. The power supply 47 can be connected to an electrical outlet (e.g., either directly or by way of another device) via a cable or wire.

The network interface 48 can include various network cards, interfaces, and circuitry implemented in software and/or hardware to enable communications with the client device 4 and the access point device 2 using the communication protocols in accordance with connection 9 (e.g., as described with reference to FIG. 1). For example, the network interface 48 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul (BH) connection between the wireless extender access point device 3 and the access point device 2, and optionally other wireless extender access point device(s) 3. Another radio or set of radios (e.g., 2.4 GHz, 5 GHz, and/or 6 GHz radio(s)) provides a fronthaul (FH) connection between the extender access point device 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure.

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender access point device 3 in accordance with the embodiments described in the present disclosure. General communication between the components (e.g., 46-49 and 51) of the extender access point device 3 may be established using the internal bus 53.

The access point device 2 can be, for example, a hardware electronic device that can combine one or more functions of any of a modem, a gateway (for example, a residential gateway), an access point (AP), a router, or combinations thereof for providing any asset or content received from the asset provider via ISP 1 to network or wireless network devices (e.g., extender access point devices 3, client devices 4) in the system, for example, network environment 100 of FIG. 1. It is also contemplated by the present disclosure that the access point device 2 can include the function of, but is not limited to, an IP/QAM STB or SMD that is capable of decoding audio/video content, and playing OTT or MSO provided content.

As shown in FIG. 2, the access point device 2 includes a user interface 20, a network interface 21, a power supply 22, a wide area network (WAN) interface 23, a memory 24, and a controller 26. The user interface 20 can include, but is not limited to, push buttons, a keyboard, a keypad, an LCD, a TFT, an LED, an HD or other similar display device including a display device having touch screen capabilities so as to allow interaction between a user and the access point device 2. The network interface 21 may include various network cards, and circuitry implemented in software and/or hardware to enable communications with the extender access point device 3 and the client device 4 using the communication protocols in accordance with connection 9 (e.g., as described with reference to FIG. 1). Additionally, the various network cards, interfaces, and circuitry of the network interface 21 enable communications with a client device 4 (e.g., a mobile device) using the one or more communication protocols in accordance with connection 10 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) provides a backhaul (BH) connection between the access point device 2 and the wireless extender access point device(s) 3. Another radio or set of radios (e.g., 2.4 GHz, 5 GHz, and/or 6 GHz radio(s)) provides a FH connection between the access point device 2 and one or more client devices 4.

The power supply 22 supplies power to the internal components of the access point device 2 through the internal bus 27. The power supply 22 can be connected to an electrical outlet (e.g., either directly or by way of another device) via a cable or wire.

The wide area network (WAN) interface 23 may include various network cards, and circuitry implemented in software and/or hardware to enable communications between the access point device 2 and the ISP 1 and/or biometric tracking service 18 using the wired and/or wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for controlling the general functions and operations of the access point device 2 and controlling and/or configuring one or more network devices (for example, wireless extender access point devices 3 and client devices 4) in the network in accordance with the embodiments described in the present disclosure (e.g., providing enhanced authentication for access to one or more network features). Memory 24 can also store any of one or more authentication configurations or settings. For example, memory 24 can comprise any of a Keychain storage, a database, a file system, any other storage medium, or a combination thereof for storing the one or more authentication configurations. The software 25 can comprise one or more computer-readable instructions that cause the access point device 2 to control one or more network devices of a user environment.

The controller 26 controls the general operations of the access point device 2 as well as performs management functions related to the other network devices (wireless extender access point devices 3 and client device 4) in the network. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the access point device 2 in accordance with the embodiments described in the present disclosure including, but not limited to, controlling one or more network devices of a user environment. For example, the software 25 can include a control application or an interface to a control application that interfaces with a biometric authentication application of a client device 4 and/or a biometric repository 18. Communication between the components (e.g., 20-26) of the access point device 2 may be established using the internal bus 27. The controller 26 may also be referred to as a processor, generally. In one or more embodiments, the access point device 2 includes the functionality of any client device 4 discussed herein.

Figure 3A:
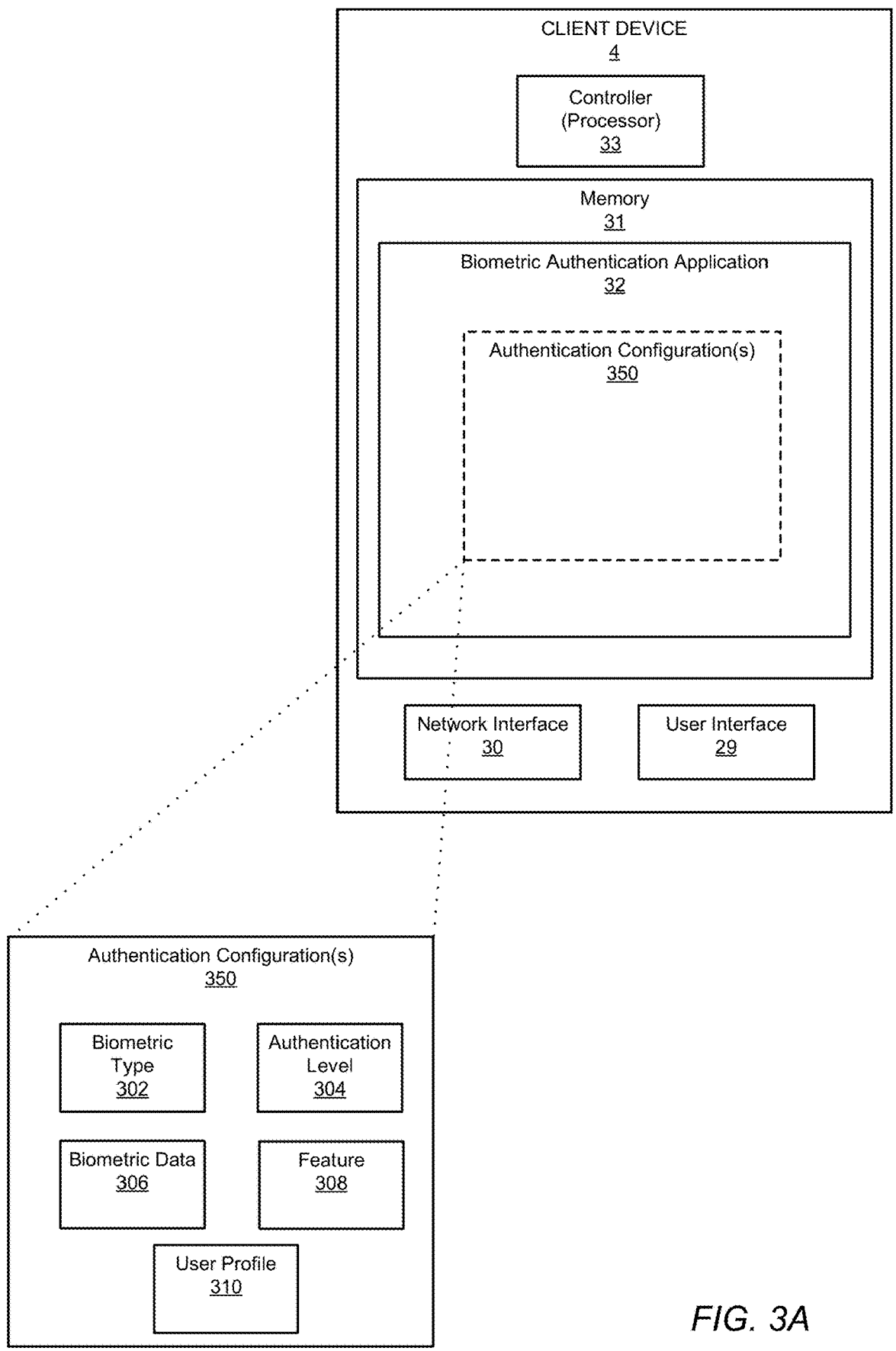
FIGS. 3A and 3B illustrate a more detailed block diagram of a biometric authentication application, according to one or more aspects of the present disclosure.
Figure 3B:
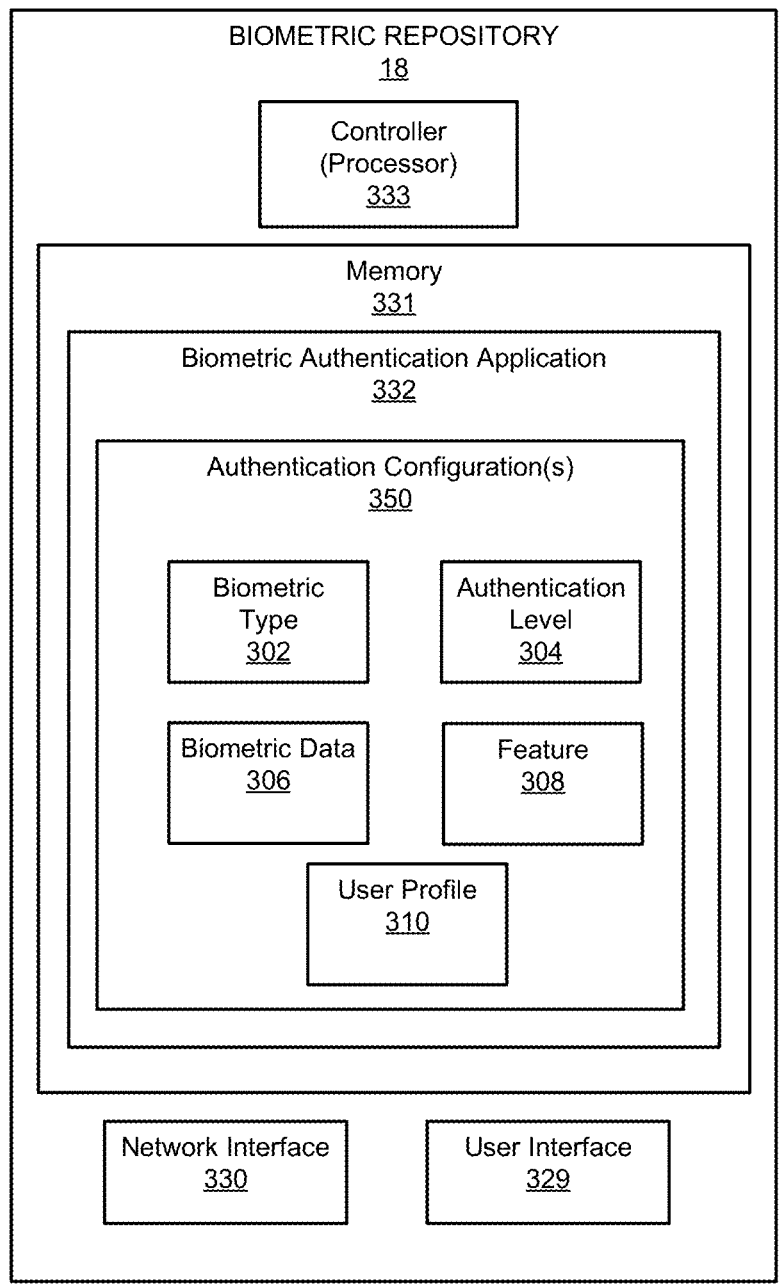

FIGS. 3A and 3B illustrate a more detailed block diagram of a biometric authentication application, according to one or more aspects of the present disclosure. While FIGS. 3A and 3B illustrate a client device 4 and a biometric repository 18, respectively, the present disclosure contemplates that the biometric authentication application could be implemented at any one or more network devices.

An access point device 2 can include an interface that allows for a user to access or update one or more network features or settings. For example, access point device 2 can include an API that allows for a control application running on another network device to perform on-boarding of the access point device 2 and/or to access or update the one or more network features or settings associated with a network provided by access point device 2. Typically, once the control application is installed and running on a network device the only authentication required to access any of the network features available to the control application is a username and password or SSO, for example, as provided during the on-boarding process of the access point device 2. Any user that obtains the control application and the SSO credentials can fully access the entirety of the network features or settings accessible via the control application. Thus, there is a need to provide enhanced security for one or more network features or settings accessible via such a control application, for example, one or more critical or key network features.

FIG. 3A illustrates a client device 4 as a client device 4 as discussed with reference to FIG. 2. A client device 4 can include a software application 32, referred to as a biometric authentication application 32. In one or more embodiments, the biometric authentication application 32 can comprise or otherwise interface with a control application running on the client device 4 for interfacing with access point device 2. Any of one or more authentication configurations 350 associated with one or more network features or settings can be created, updated and/or accessed via a user interface 29. For example, user interface 29 can be any of a graphical user interface (GUI), a command line interface, a web interface, any other user interface for presenting data to and receive data from a user, or any combination thereof.

The one or more authentication configurations 350 can comprise any of one or more biometric types 302, one or more authentication levels 304, a biometric data 306 associated with a user, one or more features 308, one or more user profiles 310 associated with one or more user, or any combination thereof. An authentication configuration 350 can be accessed, created, altered and/or otherwise utilized by the biometric authentication application 32. In one or more embodiments, as indicated by the dotted lines, one or more authentication configurations 350 can be stored locally in memory 31 or remotely, for example, at any of a biometric repository 18, an access point device 2, any other network device or storage medium, or any combination thereof. In one or more embodiments, the one or more authentication configurations 350 are stored as one or more items in a Keychain, encrypted data in a dedicated storage medium, or any other location in a memory 31. The present disclosure contemplates that an authentication configuration 350 are extensible such that additional hardware and/or software capabilities can provide for any of one or more additional biometric types 302, one or more authentication levels 304, one or more features 308, one or more user profiles 310, or any combination thereof.

The one or more biometric types 302 can include one or more types of biometrics that can be required for verifying access to one or more network features or settings including, but not limited, to a fingerprint (such as a thumbprint) 302C, a facial recognition 302B, an OTP 302D, an iris rendering 302A, a voice recognition 302E, any other type of biometric or distinguishing characteristic, or any combination thereof. The one or more biometric types 302 can include other biometrics that may not be unique to a user, such as a height.

The one or more authentication levels 304 are indicative of a level of authentication, for example, any alphanumeric character or representation, such as a numeric value, or any other value that can be used to differentiate levels of authentication. For example, as illustrated in FIG. 4A, the one or more authentication levels 304 can be one or more numerical values ranging from 1 to 8 with each authentication level 304 associated with one or more biometric types 302.

The one or more features 308 can include, but are not limited to, any of one or more settings, network transactions, a primary network setting, a guest network setting (including, but not limited to, creating or enabling a guest network), a parent control profile and/or setting, a throttling setting (for example, a setting associated with throttling of data to/from one or more network devices), hardware additions to the network (such as adding one or more access point devices 2, for example, a router, a gateway, a modem, etc.), quality of service (QOS), static internet protocol (IP) assignments to one or more client devices 4, a domain name system (DNS) setting, a user account setting, creating an authentication configuration 350, any other network or device parameter, or a combination thereof. For example, as illustrated in FIG. 4B, the one or more features 308 can be associated with an authentication level 304 such as a subnet change, a network transaction, a parental control, a primary network password, a guest network password, quality of service (QoS), a time zone, and a default device information (such as model number, version number, etc.) are associated with an authentication level 304 of 1, 2, 4, 4, 5, 5, 7, and 8, respectively.

One or more user profiles 310 can be associated with one or more users or one or more types of users. For example, a primary user profile 310 can be associated with a parent or administrator user, a secondary user profile 310 can be associated with a child or guest user, and/or any other user profile 310 can be associated with any particular user, type of user and/or group of users. In one or more embodiments, the user profile 310 is associated with one or more features 308 that require one or more authentication levels 304.

The biometric data 306 can include biometric data required for a user to access a network feature or setting, for example, real-time biometric data, or previously stored biometric data, for example, previously stored biometric data 402 as shown in FIG. 4C. The previously stored biometric data 402 can be associated with one or more features 308. In one or more embodiments, the biometric data 306 and/or 402 can correspond to or be associated with a user profile 310. For example, a user 502 can be associated with a primary profile 310 while a user 503 can be associated with a secondary profile 310. The user profile 310 and/or the previously stored biometric data 402 associated with each user of a profile 310 can be associated with different features 308 as illustrated in FIG. 4C. The biometric data can be stored using any one or more file formats appropriate for or that correspond to the type of biometric data.

For example, a user can on-board an access point device 2 using a control application installed on the user's device (a client device 4) and credentials, such as a username and password. Once the client device 4 is connected to the access point device 2 (such as a home network router), the only way to block or limit access by the client device 4 to certain content is by using a parental control setting of the one or more network settings accessible via the control application. The parent user can limit access to the content based on a website or a URL, a time, a day, type of content, etc., via the parental control setting. The parental control setting can be associated with any of one or more client devices 4, one or more users, one or more applications, one or more network transaction, or any combination thereof. However, the credentials to set the parental control setting are the same as those for accessing the control application. That is, once the parental control setting is enabled and configured, any user with access to the control application can access the parental control setting without any additional authentication. Further, any user of the client device 4 may have access to the parental control settings simply by taking control of the client device 4, such as a parent giving a child a mobile phone for playing games. Any changes to the parental control setting or any other network feature can go unnoticed leading to security issues and/or unintended consequences. By providing a verification using biometric data security is enhanced as access to one or more network features or settings requires more than the originally issued credentials. For example, an authentication level of 4 can be associated with a parental control setting (as illustrated in FIG. 4B) such that a child user cannot override the setting by a parent user without providing the additional level of authentication (such as a facial recognition as illustrated in FIG. 4A) even though the child user has access to one or more other network features or settings (such as default device information).

As another example, a user (such as a parent user or a system administrator) can select one or more client devices 4 as a group and assign the group a particular subnet range. As illustrated in FIG. 4B, the subnet change feature can be assigned an authentication level of 1 such that the highest level of authentication is required to change the assigned subnet range for the group. This group can also be associated with a QoS such that the group is given priority to network resources such as un-interrupted bandwidth, no throttling, etc. The QoS of the group can be associated with an authentication level of 5 which requires less authentication than changing the subnet but still an additional authentication over a simple SSO.

In one or more embodiments, previously received biometric data can be stored for use by the biometric authentication application so as to compare the biometric data 306 with the previously received biometric data to determine if the user should be granted access to a feature or setting 308. For example, as illustrated in FIG. 4C, one or more features 308 can be associated with one or more previously stored biometric data 402. One or more features 308 are associated with previously stored biometric data 402 for a first user, a second user, or both. The previously stored biometric data 402 can be any type of biometric data including one or more types of biometric data. The previously stored biometric data 402 can be stored in a biometric repository 18, as part of the one or more authentication configurations 350, in a memory, such as memory 31 of a client device 4, a memory 24 of an access point device 2, any other memory, any other location or storage medium, or any combination thereof. For example, a new user can be required to provide biometric data according to the level of access that is to be granted to the new user and/or a user profile 310. A primary user, for example, can be associated with a primary user profile that requires more biometric data than that of a secondary user profile. For example, a parent or administrator user can be associated with a primary user profile that requires the biometric data for each authentication level 304, such as authentication levels 1-8. In contrast, a child or guest user can be associated with a secondary user profile that requires only biometric data associated with a basic authentication level 304, such as an authentication level of 8.

In one or more embodiments, the one or more authentication configurations 350 and/or the previously stored biometric data 402 can be stored in any of a table, a database, a flat-file system, a data structure, any other data storage architecture, or a combination thereof. While FIGS. 4A-4C illustrate a structure of the one or more authentication configurations 350, the present disclosure contemplates any suitable organization or structure of the one or more authentication configurations 350. For example, the one or more authentication configurations 350 can be associated with any of one or more user profiles, a unique identifier, any other grouping identifier, or a combination thereof. For example, an authentication configuration 350 can be associated with a parent user or an administrator while another authentication configuration 350 can be associated with a child or a guest user or such distinctions between users can be established by using different user profiles 310 for each type of user. In this way, different users can be given access to different features of the network.

FIG. 3B is similar to or the same as FIG. 3A except that FIG. 3B illustrates a biometric authentication application 332 of a biometric repository 18 that is remote from a client device 4 and/or remote from access point device 2, for example, such that client device 4 can only access the biometric repository 18 via ISP 1 as discussed with reference to FIG. 1, a cellular connection as discussed with reference to FIG. 5, or any other type of connection. A biometric repository 18 can be any type of network device (for example, a server) capable of storing data, interfacing with one or more network devices (such as receiving requests for data and sending responses to requests for data), and/or providing one or more network services/resources. The biometric repository 18 can include any of a controller or processor 333 for executing one or more computer-readable instructions such as a biometric authentication application 332 stored in a memory 331, a network interface 330, a user interface 329, any other element/components, or a combination thereof.

The network interface 330 can be similar to or the same as network interfaces 21, 29, or 48. The network interface 330 connects to a network, for example, via ISP 1, a cellular link or connection, or both. The user interface 329 is similar to or the same as user interfaces 20, 29, or 46 and provides an interface between the biometric repository 18 and one or more network devices, such as a client device 4. For example, user interface 329 can provide a user of a client device 4 an interface to the biometric authentication application 332. The biometric authentication application 332 is similar to or the same as biometric authentication application 32 discussed with reference to FIG. 3A.

In one or more embodiments, the biometric repository 18 receives a request from a user of a client device 4 to create an authentication configuration 350. The request can comprise any of one or more user profiles 310, one or biometric types 302, one or more authentication levels 304, biometric data 306 (for example, an initial biometric data associated with a user), one or more features 308, or any combination thereof. The biometric data 306 can be stored as previously stored biometric data 402. For example, the request can be received as part of the on-boarding of the access point device 2 such that the primary user has the necessary credentials to create an authentication configuration 350 for use with the network provided by the access point device 2. A request can comprise an instruction to create an authentication configuration 350. The user can be associated with a user profile 310. The user and/or the user profile 310 can be associated with one or more authentication levels 304. The biometric data 402 can be associated with one or more features 308. The one or more features 308 can be associated with one or more authentication levels 304 of the user profile. The one or more authentication levels 304 can be associated with one or more biometric types 302.

Figure 5:
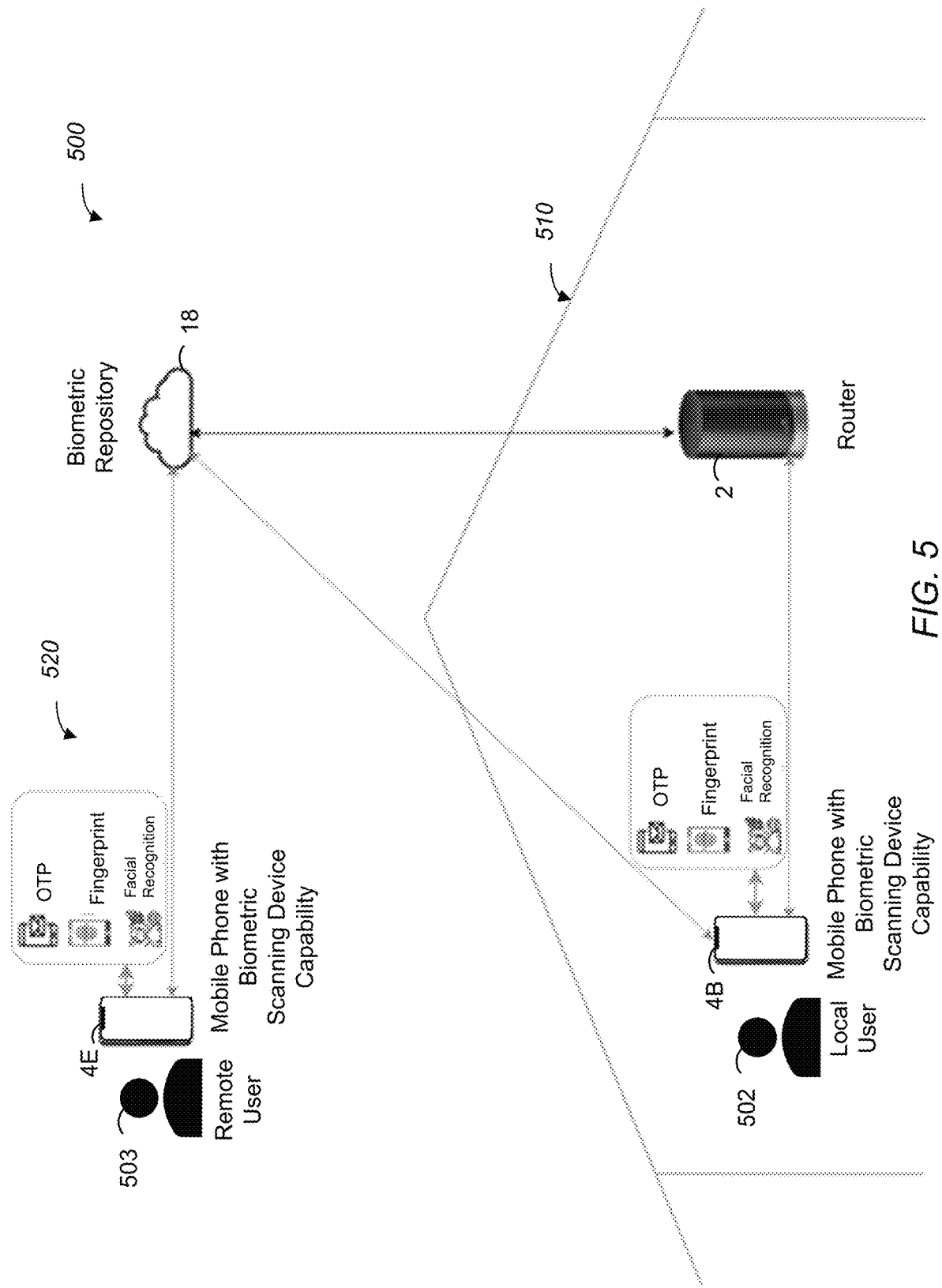
FIG. 5 illustrates an exemplary network environment for using biometrics to identify a user so as to control access to one or more settings, according to one or more aspects of the present disclosure.

FIG. 5 illustrates a network environment 500 that includes a home network 510 and a remote access network 520 where each are communicatively coupled to a biometric repository 18. In one or more embodiments, a local user 502 is associated with a client device 4B, such as a mobile phone, that includes and/or is coupled to a scanning device 5 (for example, an OTP input, a fingerprint scanner, a voice recognition system (such as a microphone and associated software), a facial recognition system (such as a camera and associated software)) that can scan or receive input from the local user 502 for one or more biometric types 302 and stores the received information as biometric data 306. The received biometric data 306 associated with the user 502 can be stored locally in memory 31 and/or can be sent via access point device 2 to the biometric repository 18 for storage. In one or more embodiments, the biometric data 306 stored at biometric repository 18 can be for restoration or back-up purposes. In one or more embodiments, the biometric data 306 is only temporarily stored for use by a biometric authentication application 32 at the client device 4B, at the biometric repository 18, or at any other network device, for example, until the request for access to a network resource has been verified or denied.

When the local user 502 attempts to access a network feature or setting, the biometric authentication application 32 controls access to the network feature by the local user 502 based on the one or more authentication configurations 350. For example, the biometric authentication application 32 compares biometric data 306 associated with a user 502 to previously stored biometric data 402 and based on that comparison the biometric authentication application 32 controls access to the requested network feature by the local user 502. Controlling access can comprise granting or denying access to the network feature.

In one or more embodiments, a remote user 503 is associated with a client device 4E, such as a mobile phone, that includes and/or is coupled to a scanning device 5. Client device 4E can operate in a manner similar to or the same as that discussed with respect to client device 4B except that client device 4E is remote from the access point device 2. The biometric authentication application 332 can request a biometric scan of a user 503 for one or more biometric types 302. The received biometric data can be stored as biometric data 306. As discussed previously, biometric data 306 can be current or real-time biometric data or previously stored biometric data 402. Remote user 503 can be allowed access to a network feature or setting the same or similar to that discussed with reference to local user 502. The remote user 503 can access one or more network features of the home network 510 by interfacing with a biometric authentication application 332 at the biometric repository 18. The biometric authentication application 332 can determine or detect that the remote user 503 is not within the home network 510 and thus can require additional authentication, such as a higher authentication level than that identified or required by an authentication level 304 associated with feature 308, an additional password, any other additional authentication, or a combination thereof. In one or more embodiments, client device 4E can include a biometric authentication application 32 and can access or query the biometric repository 18 for previously stored biometric data 402.

Figure 6:
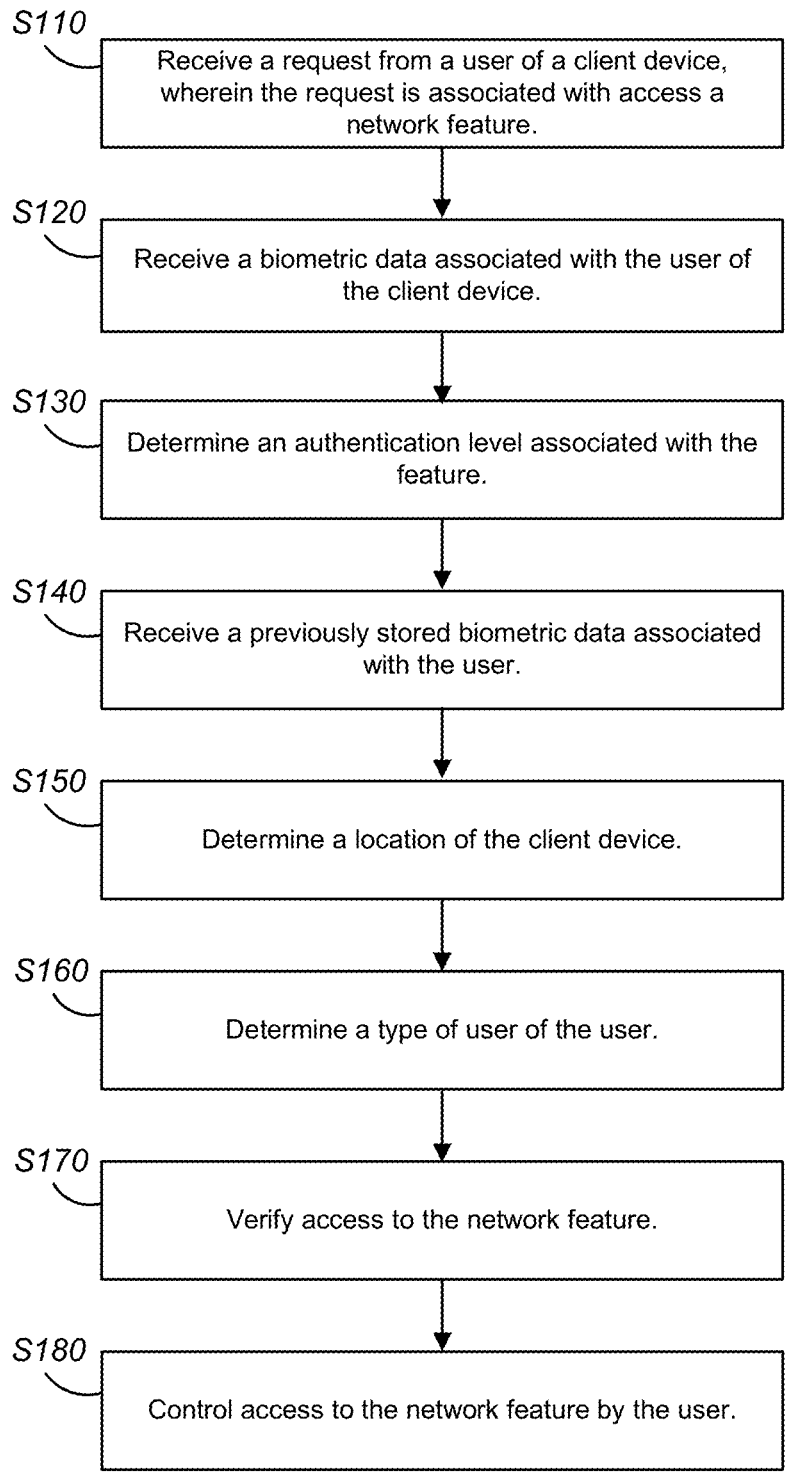
FIG. 6 is a flow chart illustrating a method for utilizing a biometric authentication application to control access to one or more features of a network, according to one or more aspects of the present disclosure.

FIG. 6 is a flow chart illustrating a method for controlling access to a network feature or setting associated with a network by utilizing a biometric authentication application, based, at least in part, on one or more authentication configurations 350, according to one or embodiments of the present disclosure.

An access point device 2, a biometric repository 18, a client device 4, or a combination thereof, for example, of a network environment 100, may be programmed with one or more instructions (e.g., software 25 stored in memory 24 and/or software 32 stored in memory 31) to perform one or more operations in one or more example embodiments. In FIG. 6, it is assumed that the devices and/or elements include their respective controllers and their respective software stored in their respective memories, as discussed above in connection with FIGS. 1-5, which when executed by their respective controllers perform the functions and operations in accordance with one or more embodiments of the present disclosure.

In one or more embodiments, a non-transitory computer-memory can store one or more computer-readable instructions that when executed by a controller or processor perform or cause a network device to perform one or more of the operations of steps S110-S180. In one or more embodiments, the one or more instructions can be one or more software or applications, for example, a biometric authentication application. While the steps S110-S180 are presented in a certain order, the present disclosure contemplates that any one or more steps can be performed simultaneously, substantially simultaneously, repeatedly, in any order or not at all (omitted).

To provide an improved security, authentication and control of a network environment, one or more novel solutions as discussed with reference to steps S110-S180 are provided to control access to one or more network features of the network based on one or more authentication configurations.

At step S110, a biometric authentication application receives a request from a user of a client device to access a network feature associated with a network provided by an access point device 2. As discussed with reference to FIGS. 3A and 3B, the biometric authentication application can reside at any network device, such as any of client device 4, access point device 2, biometric repository 18, or any combination thereof. For example, after on-boarding of the access point device 2 via a control application at a client device 4 is completed, any user of client device 4 can access one or more network features or settings by simply using the on-boarding credentials with the control application. A biometric authentication application that is part of or interfaces with the control application can add additional security by requiring that the requested access be verified according to one or more aspects of the present disclosure. In one or more embodiments, the request can comprise any of an instruction to create, modify, update, alter, access, view, or any other instruction associated with the network feature, or any combination thereof.

At step S120, the biometric authentication application receives a biometric data associated with the user of the client device 4. For example, the client device 4 can include or be coupled to a scanning device 5 that provides sensing information associated with a biometric data 306. In one or more embodiments, the type of biometric that must be scanned by the scanning device 5 is based, at least in part, on any of a user profile 310, a feature 308, an authentication level 304, a biometric type 302, or any combination thereof. In one or more embodiments, the biometric authentication application determines that the network feature is a critical or key feature prior to proceeding with step S120. For example, if the network feature is determined to not be a critical or key feature, then additional authentication is not required and steps S120-170 can be omitted.

At step S130, the biometric authentication application determines an authentication level 304 associated with the network feature. For example, the network feature can correspond to a feature 308 of one or more authentication configurations 350.

At step S140, the biometric authentication application receives a previously stored biometric data 402 associated with the user. In one or more embodiments, the previously stored biometric data 402 can be retrieved from a biometric repository that is local to the client device 4 or remote from the client device 4. A remote biometric repository can include any of a biometric repository 18 accessible via ISP 1, a memory 24 at an access point device 2, any other storage medium accessible by the client device 4, or any combination thereof.

At step S150, the biometric authentication application determines a location of the client device 4. For example, a different authentication level 304 can be required for a client device 4E as opposed to a client device 4B as discussed with reference to FIG. 5. In one or more embodiments, the determination of the authentication level of step S130 can be based, at least in part, on the location of the client device 4.

At step S160, the biometric authentication application determines a user profile 310 associated with the user. The user profile 310 can be associated with an authentication level 304 such that the determination of the authentication level from step S130 can be based, at least in part, on the user profile 310.

At step S170, the biometric authentication application verifies access to the network feature by the user of the client device 4. The verification can be based, at least in part, on any one or more elements of the authentication configuration 350 as discussed with reference to FIGS. 3A and 3B. For example, the biometric data 306 received at step S120 can be compared to the previously stored biometric data 402 based, at least in part, on the authentication level 304. The authentication level 304 provides a correlation to or is associated with one or more features 308. The network feature associated with the request is compared to one or more features 308 to determine an authentication level 304. The authentication level 304 corresponds to or is associated with one or more biometric types 302. The comparison can comprise determining if the biometric data 306 includes data associated with each biometric type 302 required by the authentication level 304 and whether this data matches or has a correlation with the corresponding data of the previously stored biometric data 402 associated with user.

In one or more embodiments, if the verification determines that an OTP 302D is required, for example, based on the authentication level 304, an OTP can be sent to a primary user, such as via a specific client device 4 associated with the primary user. The OTP can be sent from a biometric repository 18, a biometric authentication application at any network device, or both. An approval from the primary user or the specific client device 4 is then required before access to the network resource can be granted.

At step S180, the biometric authentication application controls access to the network feature by the user based, at least in part, on the verifying the access to the network feature from step S170, for example, the comparison of the biometric data to the previously stored biometric data. If the biometric authentication application determines that verification is not successful at step S170, the request to access the network feature is denied. For example, a user can be sent a prompt that indicates that the request has been denied. If the biometric authentication application determines that verification is successful at step S170, the request to access the network feature is granted. For example, the user can create, modify, view or otherwise access the network feature.

According to one or more example embodiments of inventive concepts disclosed herein, there are provided novel solutions for controlling access, by a biometric authentication application, to one or more network features or settings associated with a network. In addition, there is provided a novel interface to obtain biometric data associated with a user for use by the biometric authentication application to verify the user based on an authentication configuration that includes biometric data. The novel solutions according to example embodiments of inventive concepts disclosed herein provide features that enhance the network environment of, for example, a home/residential network gateway (GW), wireless access points (Wi-Fi APs), Home Network Controller (HNC), wireless routers, mesh networking nodes (e.g., Wi-Fi EasyMesh systems), and the like, by providing increased security for certain key or sensitive features.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A method for utilizing a biometric authentication application to control access to one or more features associated with access to a network comprising:
   receiving a request from a user of a client device to access a network feature of the network;
   receiving a biometric data associated with the user of the client device;
   comparing the network feature associated with the request to the one or more features;
   determining an authentication level associated with the network feature based on the comparison of the network feature and the one or more features;
   verifying access to the network feature, wherein the verifying the access comprises:
      comparing the biometric data to previously stored biometric data associated with the user based, at least in part, on the authentication level; and
   controlling access to the network feature by the user based, at least in part, on the comparing the biometric data to the previously stored biometric data.

2. The method of claim 1, wherein the previously stored biometric data is received from a biometric repository.

3. The method of claim 1, wherein the authentication level is associated with a plurality of biometric types.

4. The method of claim 1, wherein the plurality of biometric types comprises any of a voice scan, a fingerprint, a retinal scan, a one-time password (OTP), a facial recognition, or a combination thereof.

5. The method of claim 1, further comprising:
   determining a location of the client device; and
   wherein the determining the authentication level is based, at least in part, on the location of the client device.

6. The method of claim 1, further comprising:
   determining a user profile associated with the user, wherein the user profile is associated with at least one of the one or more features that require one or more authentication levels; and
   wherein the determining the authentication level is based, at least in part, on the user profile associated with the user.

7. The method of claim 1, wherein the request is for creating an authentication configuration, wherein the authentication configuration is associated with at least one of the one or more features.

8. A biometric repository coupled to a network for providing authentication for access to network feature by a user of a client device, the biometric repository comprising:
   a memory storing one or more computer-readable instructions; and
   a processor configured to execute the one or more computer-readable instructions to:
      receive a request from a client device, wherein the request is associated with access to a network feature of the network;
      receive a biometric data associated with the user of the client device;
      compare the network feature associated with the request to the one or more features:
      determine an authentication level associated with the network feature based on the comparison of the network feature and the one or more features;
      verifying access to the network feature, wherein the verifying the access comprises:
         comparing the biometric data to previously stored biometric data associated with the user based, at least in part, on the authentication level; and
      control access to the network feature by the user based, at least in part, on the comparing the biometric data to the previously stored biometric data.

9. The biometric repository of claim 8, wherein the processor is further configured to execute the one or more computer-readable instructions to:

create an authentication configuration, wherein the authentication configuration is associated with at least one of the one or more features, and wherein creating the authentication configuration comprises:
  receiving one or more initial biometric data associated with the user;
  storing the one or more initial biometric data as the previously stored biometric data;
  associating the biometric data with one or more features, wherein the one or more features comprise the network feature;
  associating the one or more features with one or more authentication levels, wherein the one or more authentication levels comprise the authentication level; and
  associating the one or more authentication levels with one or more biometric types, wherein the initial biometric data is associated with at least one of the one or more biometric types.

10. The biometric repository of claim 9, wherein the processor is further configured to execute the one or more computer-readable instructions to:
  associate the user with a user profile, wherein the user profile is associated with at least one of the one or more features that require one or more authentication levels; and
  wherein the verifying the access to the network feature is based, at least in part, on the user profile associated with the user.

11. The biometric repository of claim 8, wherein the authentication level is associated with a plurality of biometric types.

12. The biometric repository of claim 11, wherein the plurality of biometric types comprises any of a voice scan, a fingerprint, a retinal scan, a one-time password (OTP), a facial recognition, or a combination thereof.

13. The biometric repository of claim 8, wherein the processor is further configured to execute the one or more computer-readable instructions to:
  determine a location of the client device; and
  wherein the determining the authentication level is based, at least in part, on the location of the client device.

14. The biometric repository of claim 8, wherein the biometric repository is remote from the client device.

15. A non-transitory computer-readable medium storing one or more computer executable instructions for controlling access to one or more features associated with access to a network, which when executed by a processor of a network device, cause the network device to perform one or more operations comprising:
  receiving a request from a user of a client device to access a network feature of the network;
  receiving a biometric data associated with the user of the client device;
  comparing the network feature associated with the request to the one or more features;
  determining an authentication level associated with the network feature based on the comparison of the network feature and the one or more features;
  verifying access to the network feature, wherein the verifying the access comprises:
    comparing the biometric data to previously stored biometric data associated with the user based, at least in part, on the authentication level; and
    controlling access to the network feature by the user based, at least in part, on the comparing the biometric data to previously stored biometric data.

16. The non-transitory computer-readable medium of claim 15, wherein the one or more computer executable instructions when executed by the processor further cause the network device to perform one or more further operations comprising:
  receiving, from a biometric repository, the previously stored biometric data associated with the user.

17. The non-transitory computer-readable medium of claim 15, wherein the authentication level is associated with a plurality of biometric types.

18. The non-transitory computer-readable medium of claim 15, wherein the plurality of biometric types comprises any of a voice scan, a fingerprint, a retinal scan, a one-time password (OTP), a facial recognition, or a combination thereof.

19. The non-transitory computer-readable medium of claim 15, wherein the one or more computer executable instructions when executed by the processor further cause the network device to perform one or more further operations comprising:
  determining a location of the client device; and
  wherein the determining the authentication level is based, at least in part, on the location of the client device.

20. The non-transitory computer-readable medium of claim 15, wherein the one or more computer executable instructions when executed by the processor further cause the network device to perform one or more further operations comprising:
  determining a user profile associated with the user, wherein the user profile is associated with at least one of the one or more features that require one or more authentication levels; and
  wherein the determining the authentication level is based, at least in part, on the user profile associated with the user.

* * * * *